(12) United States Patent
Nakamura et al.

(10) Patent No.: US 9,543,057 B2
(45) Date of Patent: Jan. 10, 2017

(54) CONDUCTIVE CELLULOSE-BASED RESIN COMPOSITION

(71) Applicant: DAICEL CORPORATION, Osaka-shi, Osaka (JP)

(72) Inventors: Toshikazu Nakamura, Himeji (JP); Shu Shimamoto, Tokyo (JP); Shizuka Okada, Himeji (JP); Hiroki Taniguchi, Himeji (JP)

(73) Assignee: DAICEL CORPORATION, Osaka-shi (JP)

( * ) Notice: Subject to any disclaimer, the term of this patent is extended or adjusted under 35 U.S.C. 154(b) by 0 days.

(21) Appl. No.: 14/419,946

(22) PCT Filed: Aug. 8, 2013

(86) PCT No.: PCT/JP2013/071522
§ 371 (c)(1),
(2) Date: Feb. 6, 2015

(87) PCT Pub. No.: WO2014/024978
PCT Pub. Date: Feb. 13, 2014

(65) Prior Publication Data
US 2015/0221410 A1    Aug. 6, 2015

(30) Foreign Application Priority Data

Aug. 8, 2012 (JP) .................................. 2012-175786

(51) Int. Cl.
| | |
|---|---|
| *H01B 1/04* | (2006.01) |
| *H01B 1/24* | (2006.01) |
| *H01M 4/583* | (2010.01) |
| *B82Y 30/00* | (2011.01) |
| *C08L 1/10* | (2006.01) |
| *C08K 3/04* | (2006.01) |
| *C08K 7/24* | (2006.01) |
| *C08J 5/18* | (2006.01) |

(52) U.S. Cl.
CPC . *H01B 1/24* (2013.01); *C08J 5/18* (2013.01); *C08K 3/04* (2013.01); *C08K 7/24* (2013.01); *C08L 1/10* (2013.01); *C08J 2301/12* (2013.01); *C08K 2201/001* (2013.01); *C08K 2201/011* (2013.01)

(58) Field of Classification Search
CPC ...... H01B 1/02–1/04; H01B 1/24; B82Y 3/00; B82Y 4/00; B82Y 30/00; H01M 4/583
USPC ....... 252/500–511; 429/231.8; 977/734, 773, 977/788
See application file for complete search history.

(56) References Cited

U.S. PATENT DOCUMENTS

| | | | | |
|---|---|---|---|---|
| 3,376,149 A | * | 4/1968 | Gandy .................... | C08L 1/12 |
| | | | | 106/162.72 |
| 2003/0187181 A1 | * | 10/2003 | Sakane .................. | B41M 5/44 |
| | | | | 528/355 |
| 2009/0001326 A1 | * | 1/2009 | Sato ....................... | B82Y 30/00 |
| | | | | 252/511 |
| 2010/0084616 A1 | * | 4/2010 | Brule ...................... | H01B 1/24 |
| | | | | 252/511 |
| 2011/0201731 A1 | | 8/2011 | Korzhenko et al. | |
| 2013/0150501 A1 | * | 6/2013 | Basu ....................... | C08L 1/12 |
| | | | | 524/41 |

FOREIGN PATENT DOCUMENTS

| | | | |
|---|---|---|---|
| CN | 102264809 A | 11/2011 | |
| JP | 43-24547 B | 10/1968 | |
| JP | 48-60934 A | 8/1973 | |
| JP | 59-18734 A | 1/1984 | |
| JP | EP 1471114 A1 * | 10/2004 | ............ B82Y 30/00 |
| JP | 2011-132457 A | 7/2011 | |
| JP | 2011-132466 A | 7/2011 | |

OTHER PUBLICATIONS

Basavaraja et al., "Electromagnetic Interference Shielding of Cellulose Triacetate/Multiwalled Carbon Nanotube Composite Films", Polymer Composites, vol. 32, No. 3, Mar. 2011, pp. 438-444.
Blanchet et al., "Polyaniline nanotube composites: A high-resolution printable conductor", Applied Physics Letters, vol. 82, No. 8, Feb. 24, 2003, pp. 1290-1292.
Jeon et al., "High performance cellulose acetate propionate composites reinforced with exfoliated graphene", Composites: Part B: engineering, vol. 43, Issue 8, Dec. 2012 (Available Online Jan. 9, 2012), pp. 3412-3418.
Karim et al., "Synthesis and Characterization of Conducting Polythiophene/Carbon Nanotubes Composites", Journal of Polymer Science: Part A: Polymer Chemistry, vol. 44, 2006, pp. 5283-5290.
Kim et al., "Charge transport properties of composites of multiwalled carbon nanotube with metal catalyst and polymer: application to electromagnetic interference shielding", Current Applied Physics, vol. 4, 2004 (Available online Apr. 12, 2014), pp. 577-580.
Li et al., "Cellulose Acetate/Multiwalled Carbon Nanotube Nanocomposites with Improved Mechanical, Thermal, and Electrical Properties", Journal of Applied Polymer Science, vol. 118, No. 4, Nov. 15, 2010 (Published online in Wiley InterScience Jun. 7-22, 2010), pp. 2475-2481.
Zhang et al., "Surfactant-Directed Polypyrrole/CNT Nanocables: Synthesis, Characterization, and Enhanced Electrical Properties", ChemPhysChem vol. 5, 2004, pp. 998-1002.
International Search Report (Form PCT/ISA/210) for International Application No. PCT/JP2013/071520, dated Oct. 1, 2013.
Spitalsky et al., "Carbon nanotube-polymer composites: Chemistry, processing, mechanical and electrical properties," Progress in Polymer Science, vol. 35, 2010 (Available online Sep. 25, 2009), pp. 357-401.
U.S. Office Action for U.S. Appl. No. 14/420,288, dated May 6, 2016.

* cited by examiner

*Primary Examiner* — Tri V Nguyen
(74) *Attorney, Agent, or Firm* — Birch, Stewart, Kolasch & Birch, LLP

(57) ABSTRACT

The conductive cellulose-based resin composition of the present invention comprises (A) a cellulose acetate ester having a total degree of acetyl substitution of 0.5 to 1.1 and (B) at least one carbon material selected from the group consisting of single-walled carbon nanotube, multi-walled carbon nanotube, single-layer graphene, multi-layer graphene, fullerene, and carbon black. This conductive cellulose resin composition exhibits high conductivity even without being supplemented with a special resin or a third component. Also, the conductive cellulose-based resin composition can be easily molded in an aqueous system.

8 Claims, No Drawings

CONDUCTIVE CELLULOSE-BASED RESIN COMPOSITION

TECHNICAL FIELD

The present invention relates to a cellulose-based resin composition excellent in conductivity, a conductive molding comprising the cellulose-based resin composition, and a method for producing the same.

BACKGROUND ART

Heretofore, methods of kneading (adding) carbon black into a resin and obtaining a desired molding by thermoforming, and methods of vapor-depositing a metal onto the surface of a resin molding to decrease a surface specific resistance value, for example, have been practiced in order to impart conductivity to resins. Of them, the methods of kneading carbon black into a resin require increasing the amount of carbon black added for enhancing conductivity, whereas too large an amount thereof reduces the outer appearance and mechanical strength of the resulting resin molding. Therefore, there are limits to the amount of carbon black added; thus the conductivity is not sufficient. Also, the methods of vapor-depositing a metal onto the surface of a resin molding may produce insufficient adhesion strength between the vapor-deposited metal and the resin molding, and are complicated because additional pretreatment and vapor deposition steps, etc. are necessary for the vapor deposition.

In recent years, methods for decreasing a surface specific resistance value or a volume specific resistance value by using a carbon nanotube as a substitute for carbon black have been attempted in order to obtain higher conductivity (Non Patent Literatures 1 to 4). However, for exhibiting high conductivity by mixing a carbon nanotube with a resin, it is required to use a special resin or to add a third component. Furthermore, for molding a resin composition containing a carbon nanotube into a film, it is required to dissolve the resin composition in a solvent, followed by shaping. In recent years, there have been demands for techniques of processing conductive moldings without the use of solvents, from the viewpoint of the reduction of environmental burdens.

CITATION LIST

Non Patent Literature

Non Patent Literature 1: J. Polym. Sci. Part A Polym. Chem., 2006, 44, 5283
Non Patent Literature 2: ChemPhysChem, 2004, 5, 998
Non Patent Literature 3: Appl. Phys. Lett., 2003, 82, 1290
Non Patent Literature 4: Curr. Appl. Phys., 2004, 4, 577

SUMMARY OF INVENTION

Technical Problem

An object of the present invention is to provide a conductive resin composition that exhibits high conductivity even without being supplemented with a special resin or a third component, a conductive molding comprising the resin composition, and a method for producing the same.

Another object of the present invention is to provide a conductive molding that has high conductivity and can also be molded in an aqueous system, and a method for producing the same.

Solution to Problem

The present inventors have conducted diligent studies to attain the objects mentioned above and consequently completed the present invention by finding that a conductive molding having high conductivity can be obtained conveniently and easily by mixing a cellulose acetate having a total degree of acetyl substitution of 0.5 to 1.1 with a carbon material such as a carbon nanotube in an aqueous system, followed by molding.

Specifically, the present invention provides a conductive cellulose-based resin composition comprising (A) a cellulose acetate ester having a total degree of acetyl substitution of 0.5 to 1.1 and (B) at least one carbon material selected from the group consisting of single-walled carbon nanotube, multi-walled carbon nanotube, single-layer graphene, multi-layer graphene, fullerene, and carbon black.

The volume resistivity of the conductive cellulose-based resin composition is, for example, $10^{-3}$ to 20 Ω·cm, preferably $10^{-3}$ to 1 Ω·cm.

In the conductive cellulose-based resin composition, the content of the carbon material (B) is, for example, 0.1 to 80% by weight of the whole conductive cellulose-based resin composition.

Also, the compositional distribution index (CDI) of cellulose acetate defined below is, for example, 1.0 to 2.0:

CDI=(Actual measurement value of the half height width of compositional distribution)/(Theoretical value of the half height width of compositional distribution)

Actual measurement value of the half height width of compositional distribution: the half height width of compositional distribution determined by the HPLC analysis of cellulose acetate propionate obtained by propionylating all residual hydroxy groups in cellulose acetate (sample).

Theoretical value of the half height width of compositional distribution=2.35482
$\sqrt{3}*DPw*(DS/3)(1-DS/3)/DPw$     [Expression 1]

DS: the total degree of acetyl substitution, and
DPw: the weight-average degree of polymerization (value determined by the GPC-light scattering method using cellulose acetate propionate obtained by propionylating all residual hydroxy groups in cellulose acetate (sample)).

The present invention also provides a conductive molding comprising the conductive cellulose-based resin composition.

The present invention further provides a method for producing the conductive molding, comprising the step of shaping an aqueous dispersion containing (A) a cellulose acetate ester having a total degree of acetyl substitution of 0.5 to 1.1 and (B) at least one carbon material selected from the group consisting of single-walled carbon nanotube, multi-walled carbon nanotube, single-layer graphene, multi-layer graphene, fullerene, and carbon black, and drying the shaped molded material containing water.

Advantageous Effects of Invention

Since a cellulose acetate ester (A) having a total degree of acetyl substitution of 0.5 to 1.1 and excellent water solubility is used in the present invention, a conductive molding having high conductivity can be produced by mixing the cellulose acetate ester (A) with a carbon material such as a carbon nanotube in an aqueous system, followed by shaping and drying. Moreover, the conductive cellulose-based resin composition of the present invention and the molding thereof exhibit high conductivity even without being supplemented with a special resin or a third component. Furthermore, the conductive cellulose-based resin composition of the present invention and the molding emit no or few greenhouse gases (SOx, NOx) even by incineration. In addition, because of excellent adhesiveness, the conductive cellulose-based resin composition of the present invention and the molding can be easily laminated with other materials (e.g., styrene-based resins such as polystyrene, acrylic resins such as polymethyl methacrylate, polyester-based resins such as polyethylene terephthalate, and resin materials made of ethylene vinyl alcohol or the like), and various laminates (laminate films, sheets, etc.) can be produced.

DESCRIPTION OF EMBODIMENTS

The conductive cellulose-based resin composition of the present invention comprises (A) a cellulose acetate ester having a total degree of acetyl substitution of 0.5 to 1.1 and (B) at least one carbon material selected from the group consisting of single-walled carbon nanotube, multi-walled carbon nanotube, single-layer graphene, multi-layer graphene, fullerene, and carbon black.

[Cellulose Acetate Ester (A)]

(Total Degree of Acetyl Substitution)

The cellulose acetate ester (A) according to the present invention has a total degree of acetyl substitution (average degree of substitution) of 0.5 to 1.1. When the total degree of acetyl substitution falls within this range, solubility in water is excellent. If the total degree of acetyl substitution falls outside this range, there is a tendency that solubility in water is reduced. The preferred range of the total degree of acetyl substitution is 0.55 to 1.0, and the more preferred range thereof is 0.6 to 0.95. The total degree of acetyl substitution can be measured by a known titration method of dissolving cellulose acetate in water and determining the degree of substitution of the cellulose acetate. Alternatively, the total degree of acetyl substitution may be measured through NMR by propionylating the hydroxy groups of cellulose acetate (see a method mentioned later) and then dissolving the resulting sample in deuterated chloroform.

The total degree of acetyl substitution is determined through conversion according to the expression given below from the degree of acetylation determined according to the method for measuring the degree of acetylation prescribed in ASTM: D-817-91 (Testing methods for cellulose acetate, etc.). This is the most general way to determine the degree of substitution of cellulose acetate.

$$DS = 162 \times AV \times 0.01/(60 - 42 \times AV \times 0.01)$$

DS: the total degree of acetyl substitution

AV: the degree of acetylation (%)

First, 500 mg of dried cellulose acetate (sample) is precisely weighed and dissolved in 50 ml of a mixed solvent of ultrapure water and acetone (molar ratio: 4:1), and 50 ml of a 1 N aqueous sodium hydroxide solution is then added thereto, followed by saponification at 25° C. for 2 hours. Next, 50 ml of 1 N hydrochloric acid is added thereto, and the amount of eliminated acetic acid is titrated against a 1 N aqueous sodium hydroxide solution (1 N sodium hydroxide normal solution) with phenolphthalein as an indicator. In addition, a blank test (test without the use of the sample) is conducted by a similar method. Then, AV (degree of acetylation) (%) is calculated according to the following expression:

$$AV\ (\%) = (A - B) \times F \times 1.21 / \text{Sample weight (g)}$$

A: the titer (ml) of the 1 N sodium hydroxide normal solution

B: the titer (ml) of the 1 N sodium hydroxide normal solution in the blank test

F: the factor of the 1 N sodium hydroxide normal solution (Compositional Distribution Index (CDI))

In the present invention, the compositional distribution (intermolecular substitution distribution) of the cellulose acetate ester (A) is not particularly limited, and the compositional distribution index (CDI) is, for example, 1.0 to 3.0. The compositional distribution index (CDI) is preferably 1.0 to 2.0, more preferably 1.0 to 1.8, further preferably 1.0 to 1.6, particularly preferably 1.0 to 1.5. As the compositional distribution index (CDI) of the cellulose acetate ester (A) is lower (i.e., closer to 1.0), the compositional distribution (intermolecular substitution distribution) is more uniform; thus strength and elongation in the form of a film are very high even if the degree of substitution is low. Furthermore, even a resin composition having a large content of the carbon material (B) can be prevented from having cracks and can be used as a self-supported film. This is because the uniform compositional distribution decreases defects in the film structure. In addition, the uniform compositional distribution can secure water solubility in a range where the total degree of substitution is wider than usual.

In this context, the compositional distribution index (CDI) is defined by the ratio of the actual measurement value of the half height width of compositional distribution to the theoretical value of the half height width of compositional distribution [(Actual measurement value of the half height width of compositional distribution)/(Theoretical value of the half height width of compositional distribution)]. The half height width of compositional distribution is also called "half height width of intermolecular substitution distribution" or simply called "half height width of substitution distribution".

The magnification of the half height width of the maximum peak in an intermolecular substitution distribution curve of cellulose acetate can be used as an index for evaluating the uniformity of the total degree of acetyl substitution of cellulose acetate. The half height width refers to a width of a chart at a height half the peak height in the chart, when the chart is plotted with the abscissa (X-axis) depicting the degree of acetyl substitution and the ordinate (Y-axis) depicting an abundance at this degree of substitution, and serves as an index that indicates how the distribution disperses. The half height width of substitution distribution can be determined by high-performance liquid chromatography (HPLC) analysis. A method for converting the abscissa (elution time) of an HPLC elution curve of a cellulose ester into the degree of substitution (0 to 3) is described in Japanese Patent Laid-Open No. 2003-201301 (paragraphs [0037] to [0040]).

(Theoretical Value of Half Height Width of Compositional Distribution)

The theoretical value of the half height width of compositional distribution (half height width of substitution distribution) can be probabilistically calculated. Specifically, the theoretical value of the half height width of compositional distribution is determined according to the following expression (1):

[Expression 2]

Theoretical value of the half height width of compositional distribution $= 2.35482\sqrt{mpq}/DPw$ \hfill (1)

m: the total number of hydroxy and acetyl groups in one molecule of cellulose acetate p: the probability that hydroxy groups in one molecule of cellulose acetate are acetyl-substituted q=i−p DPw: the weight-average degree of polymerization (determined by the GPC-light scattering method)

The method for measuring the weight-average degree of polymerization (DPw) will be mentioned later.

The theoretical value of the half height width of compositional distribution, when represented using the degree of substitution and the degree of polymerization, is represented as described below. The following expression (2) is used as a definitional equation to determine the theoretical value of the half height width of compositional distribution:

[Expression 3]

Theoretical value of the half height width of compositional distribution $= 2.35482 \sqrt{3*DPw*(DS/3)*(1-DS/3)}/DPw$ \hfill (2)

DS: the total degree of acetyl substitution

DPw: the weight-average degree of polymerization (determined by the GPC-light scattering method)

The method for measuring the weight-average degree of polymerization (DPw) will be mentioned later.

(Actual Measurement Value of Half Height Width of Compositional Distribution)

In the present invention, the actual measurement value of the half height width of compositional distribution refers to the half height width of compositional distribution determined by the HPLC analysis of cellulose acetate propionate obtained by propionylating all residual hydroxy groups (unsubstituted hydroxy groups) in cellulose acetate (sample).

In general, cellulose acetate having a total degree of acetyl substitution of 2 to 3 can be subjected without pretreatment to high-performance liquid chromatography (HPLC) analysis, whereby the half height width of compositional distribution can be determined. For example, a compositional distribution analysis method for cellulose acetate having a degree of substitution of 2.27 to 2.56 is described in Japanese Patent Laid-Open No. 2011-158664.

On the other hand, in the present invention, the actual measurement value of the half height width of compositional distribution (half height width of substitution distribution) is determined by HPLC analysis after derivatization of the intramolecular residual hydroxy groups of cellulose acetate as pretreatment for the HPLC analysis. The purpose of this pretreatment is to enable HPLC analysis by converting low substituted cellulose acetate into a derivative readily soluble in an organic solvent. Specifically, the intramolecular residual hydroxy groups are fully propionylated, and the fully derivatized cellulose acetate propionate (CAP) is subjected to HPLC analysis to determine the half height width of compositional distribution (actual measurement value). In this context, the derivatization must be fully completed so that the residual hydroxy groups are absent in the molecule whereas only acetyl and propionyl groups are present therein. Specifically, the sum of the degree of acetyl substitution (DSac) and the degree of propionyl substitution (DSpr) is 3. This is because the relational expression: DSac+DSpr=3 is used in order to prepare a calibration curve for converting the abscissa (elution time) of an HPLC elution curve of CAP into the degree of acetyl substitution (0 to 3).

The full derivatization of cellulose acetate can be carried out by the action of propionic anhydride with N,N-dimethylaminopyridine as a catalyst in a pyridine/N,N-dimethylacetamide mixed solvent. More specifically, the propionylation is carried out under conditions involving a temperature of 100° C. and a reaction time of 1.5 to 3.0 hours using 20 parts by weight of a mixed solvent [pyridine/N,N-dimethylacetamide=1/1 (v/v)] as a solvent with respect to the cellulose acetate (sample), 6.0 to 7.5 equivalents of propionic anhydride as a propionylating agent with respect to the hydroxy groups of the cellulose acetate, and 6.5 to 8.0 mol % of N,N-dimethylaminopyridine as a catalyst with respect to the hydroxy groups of the cellulose acetate. After the reaction, fully derivatized cellulose acetate propionate is obtained by precipitation using methanol as a precipitation solvent. More specifically, for example, precipitation was caused by adding 1 part by weight of the reaction mixture to 10 parts by weight of methanol at room temperature, and the obtained precipitates can be washed five times with methanol and vacuum dried at 60° C. for 3 hours to obtain fully derivatized cellulose acetate propionate (CAP). Polydispersity (Mw/Mn) and the weight-average degree of polymerization (DPw) mentioned later are also measured using the fully derivatized cellulose acetate propionate (CAP) converted from the cellulose acetate (sample) according to this method.

In the HPLC analysis mentioned above, the half height width of compositional distribution (actual measurement value) of cellulose acetate (sample) can be determined by: using a plurality of cellulose acetate propionates differing in the degree of acetyl substitution as standard samples to conduct HPLC analysis in a predetermined measurement apparatus under predetermined measurement conditions; and preparing a calibration curve [curve, usually, a cubic curve that indicates the relationship between the elution time of cellulose acetate propionate and the degree of acetyl substitution (0 to 3)] from the analysis values of these standard samples. One determined by the HPLC analysis is the relationship between the elution time and the acetyl substitution distribution of cellulose acetate propionate. This is the relationship between the elution time and the acetyl substitution distribution of a substance in which all intramolecular residual hydroxy groups in the sample have been converted to propionyloxy groups, and is therefore essentially to determine the acetyl substitution distribution of the cellulose acetate of the present invention.

The conditions of the HPLC analysis are as follows:

Apparatus: Agilent 1100 Series

Column: Waters Nova-Pak phenyl 60 Å 4 μm (150 mm×3.9 mmΦ)+guard column

Column temperature: 30° C.

Detection: Varian 380-LC

Injection volume: 5.0 μL (sample concentration: 0.1% (wt/vol))

Eluent: solution A: MeOH/H2O=8/1 (v/v), solution B: CHCl3/MeOH=8/1 (v/v)

Gradient: A/B=80/20→0/100 (28 min); Flow rate: 0.7 mL/min

In relation to the maximum peak (E) corresponding to the average degree of substitution found in the substitution distribution curve [substitution distribution curve of cellulose acetate propionate plotted with the ordinate depicting the abundance of cellulose acetate propionate and the abscissa depicting the degree of acetyl substitution] (also referred to as an "intermolecular substitution distribution curve") determined from the calibration curve, the half height width of substitution distribution is determined as follows: a base line (A-B) tangent to the base point (A) at the lower degree of substitution and to the base point (B) at the higher degree of substitution of the peak (E) is drawn, and a line perpendicular to the abscissa is drawn from the maximum peak (E) with respect to this base line. The intersection (C) between the perpendicular line and the base line (A-B) is determined to determine the midpoint (D) between the maximum peak (E) and the intersection (C). A line parallel to the base line (A-B) is drawn through the midpoint (D) to determine two intersections (A', B') with the intermolecular substitution distribution curve. From each of these two intersections (A', B'), a line perpendicular to the abscissa is drawn, and the width between the two intersections on the abscissa is defined as the half height width of the maximum peak (i.e., the half height width of substitution distribution).

Such a half height width of substitution distribution reflects that the chains of cellulose acetate propionate molecules in a sample differ in retention time depending on the degree of acetylation of hydroxyl groups on the glucose ring in each of the polymer chains constituting these molecules. Thus, ideally, the width of the retention time indicates the width of compositional distribution (in terms of the degree of substitution). However, HPLC has ducts (e.g., a guide column for protecting the column) that do not contribute to the partition. Hence, the width of the retention time that is not ascribable to the width of compositional distribution is often incorporated as an error due to the configuration of the measurement apparatus. This error is influenced by the length and inner diameter of the column, the length and routing from the column to a detector, etc., and differs depending on the configuration of the apparatus, as mentioned above. For these reasons, the half height width of substitution distribution of the cellulose acetate propionate can usually be determined as a corrected value Z according to the compensation formula given below. By use of such a compensation formula, a more accurate half height width of substitution distribution (actual measurement value) can be determined as a (substantially) constant value even in different measurement apparatuses (and measurement conditions).

$$Z=(X2-Y2)^{1/2}$$

wherein X represents the half height width of substitution distribution (uncorrected value) determined in a predetermined measurement apparatus under predetermined measurement conditions, and Y=ax+b (0≤x≤3) wherein a represents the half height width of substitution distribution of cellulose acetate having a total degree of substitution of 3, determined in the same measurement apparatus under the same measurement conditions as in X; b represents the half height width of substitution distribution of cellulose propionate having a total degree of substitution of 3, determined in the same measurement apparatus under the same measurement conditions as in X; and x represents the total degree of acetyl substitution (0≤x≤3) of the measurement sample.

The cellulose acetate (or cellulose propionate) having a total degree of substitution of 3 refers to a cellulose ester in which all hydroxyl groups of cellulose are esterified, and in fact (or ideally, is a cellulose ester having no half height width of substitution distribution (i.e., a half height width of substitution distribution of 0).

In the present invention, the actual measurement value of the half height width of compositional distribution (half height width of substitution distribution) of the cellulose acetate ester (A) is preferably 0.12 to 0.34, more preferably 0.13 to 0.25.

The theoretical formula of the substitution distribution described above gives a probabilistically calculated value on the assumption that all acetylation and deacetylation reactions proceed independently and equally. Specifically, the calculated value abides by binomial distribution. Such an ideal situation never happens in reality. Without special contrivances to the hydrolysis reaction of cellulose acetate or posttreatment after the reaction, the substitution distribution of a cellulose ester is much wider than that probabilistically determined by the binomial distribution.

One possible special contrivance to the reaction is, for example, to maintain the system under conditions where deacetylation and acetylation reactions are in equilibrium. This case, however, is not preferred because the decomposition of cellulose proceeds by an acid catalyst. Another special contrivance to the reaction is to adopt reaction conditions that slow down a deacetylation rate as to low substituted forms. However, such specific methods have heretofore been unknown. That is, a special contrivance to the reaction which controls the substitution distribution of a cellulose ester so as to abide by binomial distribution as in the theory of probability for the reaction has been unknown so far. In addition, various circumstances including an inhomogeneous acetylation process (cellulose acetylation step) and partial or transient occurrence of precipitates due to water added in stages in a ripening process (cellulose acetate hydrolysis step) act toward widening the substitution distribution compared with the binomial distribution, and it is practically impossible to achieve ideal conditions by circumventing these. This is similar to the fact that an ideal gas is just an ideal product and a real gas behaves in a somewhat different way therefrom.

The conventional synthesis and posttreatment of low substituted cellulose acetate have rarely paid attention to such problems associated with substitution distribution and have not made the measurement, validation, or discussion of the substitution distribution. For example, the literature (Journal of the Society of Fiber Science and Technology, Japan, 42, p. 25 (1986)) states that the solubility of low substituted cellulose acetate is determined depending on the distribution of acetyl groups to the 2-, 3-, and 6-positions of the glucose residues, and does not take compositional distribution into consideration.

According to the studies of the present inventors, as mentioned later, the substitution distribution of cellulose acetate can be controlled, surprisingly, by a contrivance to posttreatment conditions after the cellulose acetate hydrolysis step. The literatures (CiBment, L., and Rivibre, C., Bull. SOC. chim., (5) 1, 1075 (1934); Sookne, A. M., Rutherford, H. A., Mark, H., and Harris, M. J. Research Natl. Bur. Standards, 29, 123 (1942); and A. J. Rosenthal, B. B. White Ind. Eng. Chem., 1952, 44 (11), pp 2693-2696) have reported that fractionation depending on molecular weights and minor fractionation associated with the degree of substitution (chemical composition) occur in the precipitation fractionation of cellulose acetate having a degree of substitution of 2.3, though no previous reports show that pronounced fractionation can be achieved on the basis of the degree of substitution (chemical composition) as found by the present inventors. Furthermore, there has been no validation to confirm that the substitution distribution (chemical composition) of low substituted cellulose acetate can be controlled by dissolution fractionation or precipitation fractionation.

Another contrivance found by the present inventors to narrow the substitution distribution is the hydrolysis reaction (ripening reaction) of cellulose acetate at a high temperature not less than 90° C. (or more than 90° C.). Although detailed analysis or discussion has not been made previously as to the degree of polymerization of a product obtained through high-temperature reaction, the decomposition of cellulose has been regarded as taking precedence in the reaction at a high temperature not less than 90° C. This idea is an assumption (stereotype) based only on discussion on viscosity. The present inventors have found that, for obtaining low substituted cellulose acetate through the hydrolysis of cellulose acetate, reaction at a high temperature not less than 90° C. (or more than 90° C.) in a large amount of acetic acid, preferably in the presence of a strong acid such as sulfuric acid, does not reduce the degree of polymerization, whereas viscosity is reduced with decreases in CDI. Specifically, the present inventors have revealed that the reduction in viscosity associated with high-temperature reaction is not attributed to reduction in the degree of polymerization, but is based on reduction in structural viscosity caused by the narrowing of the substitution distribution. Upon hydrolysis of cellulose acetate under the conditions mentioned above, not only forward reaction but reverse reaction occurs; thus CDI of a product (low substituted cellulose acetate) is a very small value and its solubility in water is also remarkably improved. By contrast, upon hydrolysis of cellulose acetate under conditions where reverse reaction is less likely to occur, the substitution distribution is widened due to various factors; thus the contents of poorly water-soluble cellulose acetate having a total degree of acetyl substitution of less than 0.4 and cellulose acetate having a degree of acetyl substitution of more than 1.1 are increased, resulting in reduction in solubility in water as a whole.

(Standard Deviation of Degree of Substitution at 2-, 3-, and 6-Positions)

In the present invention, the respective degrees of acetyl substitution at the 2-, 3-, and 6-positions on the glucose ring of the cellulose acetate ester (A) can be measured by NMR according to the method of Tezuka (Tezuka, Carbonydr. Res. 273, 83 (1995)). Specifically, free hydroxy groups of a cellulose acetate sample are propionylated with propionic anhydride in pyridine. The resulting sample is dissolved in deuterated chloroform, and $_{13}$C-NMR spectra are measured. Carbon signals of acetyl groups appear in the order from the 2-position, via the 3-position, to the 6-position from a higher magnetic field in a region from 169 ppm to 171 ppm, and carbonyl carbon signals of propionyl groups appear in the same order in a region from 172 ppm to 174 ppm. The respective degrees of acetyl substitution at the 2-, 3-, and 6-positions on the glucose ring of the original cellulose diacetate can be determined from the abundance ratios between acetyl and propionyl groups at the corresponding positions. These degrees of acetyl substitution can also be determined by $^1$H-NMR, in addition to $_{13}$C-NMR.

The standard deviation a of the degree of substitution at each of the 2-, 3-, and 6-positions is defined according to the following expression:

$$\sigma^2 = \frac{1}{n-1} \sum_{i=1}^{n} (x_i - \bar{x})^2$$ [Expression 4]

σ: standard deviation
n=3
$x_i$: $x_1$ the degree of substitution at the 2-position,
   $x_2$, the degree of substitution at the 3-position, and
   $x_3$, the degree of substitution at the 6-position
$\bar{x}$: the total degree of acetyl substitution/3

In the present invention, the standard deviation of the degree of acetyl substitution at each of the 2-, 3-, and 6-positions of the glucose ring of the cellulose acetate ester (A) is preferably not more than 0.08 (0 to 0.08). Cellulose acetate having the standard deviation of not more than 0.08 has equal substitution among the 2-, 3-, and 6-positions of the glucose ring and is excellent in solubility in water. In addition, strength and elongation in the form of a film are also high.

(Polydispersity (Mw/Mn))

In the present invention, the polydispersity (Mw/Mn) is a value determined by the GPC-light scattering method using cellulose acetate propionate obtained by propionylating all residual hydroxy groups in cellulose acetate (sample).

The polydispersity (Mw/Mn) of the cellulose acetate ester (A) according to the present invention is preferably in the range of 1.2 to 2.5. Cellulose acetate having polydispersity Mw/Mn in the range mentioned above has a uniform molecular size and is excellent in solubility in water, while strength and elongation in the form of a film are also high.

The number-average molecular weight (Mn), the weight-average molecular weight (Mw), and the polydispersity (Mw/Mn) of cellulose acetate can be determined by known methods using HPLC. In the present invention, the polydispersity (Mw/Mn) of cellulose acetate requires rendering the measurement sample soluble in an organic solvent and is thus determined similarly to the method for determining the actual measurement value of the half height width of compositional distribution, by converting cellulose acetate (sample) to fully derivatized cellulose acetate propionate (CAP) and then conducting size exclusion chromatography analysis under the following conditions (GPC-light scattering method):

Apparatus: Shodex GPC "SYSTEM-21H" manufactured by Showa Denko K.K.
Solvent: acetone
Column: Two GMHxl columns (Tosoh Corp.) with guard columns (Tosoh Corp.)
Flow rate: 0.8 ml/min
Temperature: 29° C.
Sample concentration: 0.25% (wt/vol)
Injection volume: 100 μl
Detection: MALLS (multi-angle laser light scattering) (manufactured by Wyatt Technology Corp., "DAWN-EOS")
Standard for MALLS correction: PMMA (molecular weight: 27600)

(Weight-Average Degree of Polymerization (DPw))

In the present invention, the weight-average degree of polymerization (DPw) is a value determined by the GPC-light scattering method using cellulose acetate propionate obtained by propionylating all residual hydroxy groups in cellulose acetate (sample).

The weight-average degree of polymerization (DPw) of the cellulose acetate ester (A) according to the present invention is preferably in the range of 50 to 800. If the weight-average degree of polymerization (DPw) is too low, there is a tendency that strength and elongation are reduced. Alternatively, if the weight-average degree of polymerization (DPw) is too high, filterability is more likely to be poor. The weight-average degree of polymerization (DPw) is preferably 55 to 700, more preferably 60 to 600.

The weight-average degree of polymerization (DPw), as with the polydispersity (Mw/Mn), is determined similarly to the method for determining the actual measurement value of the half height width of compositional distribution, by converting cellulose acetate (sample) to fully derivatized cellulose acetate propionate (CAP) and then conducting size exclusion chromatography analysis (GPC-light scattering method).

As mentioned above, the molecular weight (degree of polymerization) and the polydispersity (Mw/Mn) of water-soluble cellulose acetate is measured by the GPC-light scattering method (GPC-MALLS, GPC-LALLS, etc.). The detection of light scattering is generally difficult in an aqueous solvent. This is because the aqueous solvent generally contains large amounts of foreign substances and are easily contaminated secondarily even after temporary purification. Furthermore, in the aqueous solvent, the expansion of molecular chains may be unstable due to the influence of ionic dissociable groups present in trace amounts. If a water-soluble inorganic salt (e.g., sodium chloride) is added in order to prevent this, a dissolved state becomes unstable and may yield associates in an aqueous solution. One effective method for overcoming this problem is to derivatize water-soluble cellulose acetate into a derivative soluble in an organic solvent, which contains only small amounts of foreign substances and are unsusceptible to secondary contamination, and to carry out the GPC-light scattering measurement in the organic solvent. Propionylation is effective as the derivatization of water-soluble cellulose acetate for this purpose, and specific reaction conditions and posttreatment are as described in the description about the actual measurement value of the half height width of compositional distribution.

(6% Viscosity)

The 6% viscosity of the cellulose acetate ester (A) according to the present invention is, for example, 5 to 500 mPa·s, preferably 6 to 300 mPa·s. If the 6% viscosity is too high, filterability may be poor. Alternatively, if the 6% viscosity is too low, strength and elongation in the form of a film are more likely to be reduced.

The 6% viscosity of cellulose acetate can be measured by the following method:

A 50-ml volumetric flask is charged with 3.00 g of a dried sample, which is then dissolved by the addition of dissolved water. The resulting 6 wt/vol % solution is transferred to a predetermined Ostwald viscometer up to the marker line, and the temperature of the solution is regulated at 25±1° C. for approximately 15 minutes. The flow time of the solution through between the time-marker lines is measured, and the 6% viscosity is calculated according to the following expression:

6% Viscosity (mPa·s)=C×P×t

C: the constant of the sample solution

P: the density of the sample solution (0.997 g/cm3)

t: the flow time of the sample solution (s)

The constant of the sample solution is determined by measuring the flow time of a standard solution for viscometer calibration [manufactured by Showa Shell Sekiyu K.K., trade name "JS-200" (in accordance with JIS Z 8809)] by the same procedures as above and calculating the constant of the sample solution according to the following expression:

Constant of the sample solution={Absolute viscosity of the standard solution (mPa·s)}/{Density of the standard solution (g/cm$^3$)×Flow time of the standard solution (s)}

(Production of Low Substituted Cellulose Acetate)

The cellulose acetate ester (A) (low substituted cellulose acetate) according to the present invention can be produced by, for example, (A) a hydrolysis step (ripening step) for cellulose acetate having a middle or high degree of substitution, (B) a precipitation step, and optionally, (C) a washing and neutralization step.

[(A) Hydrolysis Step (Ripening Step)]

In this step, cellulose acetate having a middle or high degree of substitution (hereinafter, also referred to as "raw material cellulose acetate") is hydrolyzed. The total degree of acetyl substitution of the cellulose acetate having a middle or high degree of substitution for use as a raw material is, for example, 1.5 to 3, preferably 2 to 3. Commercially available cellulose diacetate (total degree of acetyl substitution: 2.27 to 2.56) or cellulose triacetate (total degree of acetyl substitution: more than 2.56 to 3) can be used as the raw material cellulose acetate.

The hydrolysis reaction can be carried out by reacting the raw material cellulose acetate with water in the presence of a catalyst (ripening catalyst) in an organic solvent. Examples of the organic solvent include acetic acid, acetone, and alcohols (methanol, etc.), and mixed solvents thereof. Among these, a solvent containing at least acetic acid is preferred. A catalyst generally used as a deacetylation catalyst can be used as the catalyst. The catalyst is particularly preferably sulfuric acid.

The amount of the organic solvent (e.g., acetic acid) used is, for example, 0.5 to 50 parts by weight, preferably 1 to 20 parts by weight, more preferably 3 to 10 parts by weight, with respect to 1 part by weight of the raw material cellulose acetate.

The amount of the catalyst (e.g., sulfuric acid) used is, for example, 0.005 to 1 parts by weight, preferably 0.01 to 0.5 parts by weight, more preferably 0.02 to 0.3 parts by weight, with respect to 1 part by weight of the raw material cellulose acetate. If the amount of the catalyst is too small, the molecular weight of cellulose acetate may be decreased due to too long a time for hydrolysis. On the other hand, if the amount of the catalyst is too large, the degree of change in depolymerization rate depending on the hydrolysis temperature is large so that the depolymerization rate is large even at a somewhat low hydrolysis temperature, making it difficult to obtain cellulose acetate having a moderately large molecular weight.

The amount of water in the hydrolysis step is, for example, 0.5 to 20 parts by weight, preferably 1 to 10 parts by weight, more preferably 2 to 7 parts by weight, with respect to 1 part by weight of the raw material cellulose acetate. Also, the amount of this water is, for example, 0.1 to 5 parts by weight, preferably 0.3 to 2 parts by weight, more preferably 0.5 to 1.5 parts by weight, with respect to 1 part by weight of the organic solvent (e.g., acetic acid). Although the whole amount of water may be present in the system at the start of the reaction, a portion of water used may be present in the system at the start of the reaction and the remaining portion may be added in one to several portions into the system in order to prevent the precipitation of cellulose acetate.

The reaction temperature in the hydrolysis step is, for example, 40 to 130° C., preferably 50 to 120° C., more preferably 60 to 110° C. Particularly, in the case of setting the reaction temperature to not less than 90° C. (or to more than 90° C.) and, preferably, using a strong acid such as sulfuric acid as a catalyst, and using an excess of acetic acid as a reaction solvent, not only forward reaction (hydrolysis reaction) but reverse reaction (acetylation reaction) occurs, and as a result, substitution distribution is narrowed so that low substituted cellulose acetate having a very small compositional distribution index CDI can be obtained even without particular contrivances to posttreatment conditions. Also, in the case of setting the reaction temperature to not more than 90° C., low substituted cellulose acetate having a very small compositional distribution index CDI can be obtained, as mentioned later, by precipitation using a mixed solvent comprising not less than two solvents as a precipitation solvent in the precipitation step or by precipitation fractionation and/or dissolution fractionation.

[(B) Precipitation Step]

In this step, after the completion of the hydrolysis reaction, the temperature of the reaction system is lowered to room temperature by cooling, and low substituted cellulose acetate is precipitated by the addition of a precipitation solvent. An organic solvent miscible with water or an organic solvent having large solubility in water can be used as the precipitation solvent. Examples thereof include: ketones such as acetone and methyl ethyl ketone; alcohols such as methanol, ethanol, and isopropyl alcohol; esters such as ethyl acetate; nitrogen-containing compounds such as acetonitrile; ethers such as tetrahydrofuran; and mixed solvents thereof.

When a mixed solvent comprising not less than two solvents is used as the precipitation solvent, similar effects as in the precipitation fractionation mentioned later are produced so that low substituted cellulose acetate having narrow compositional distribution (intermolecular substitution distribution) and a small compositional distribution index (CDI) can be obtained. Preferred examples of the mixed solvent include a mixed solvent of acetone and methanol, and a mixed solvent of isopropyl alcohol and methanol.

The low substituted cellulose acetate obtained by the precipitation can be further subjected to precipitation fractionation (fractional precipitation) and/or dissolution fractionation (fractional dissolution) to thereby obtain low substituted cellulose acetate having narrow compositional distribution (intermolecular substitution distribution) and a very small compositional distribution index CDI.

The precipitation fractionation can be carried out, for example, by: dissolving the low substituted cellulose acetate (solid matter) obtained by the precipitation in water to prepare an aqueous solution having an appropriate concentration (e.g., 2 to 10% by weight, preferably 3 to 8% by weight); adding a poor solvent to this aqueous solution (or adding the aqueous solution to a poor solvent); keeping the mixture at an appropriate temperature (e.g., not more than 30° C., preferably not more than 20° C.) to precipitate the low substituted cellulose acetate; and recovering the precipitates. Examples of the poor solvent include: alcohols such as methanol; and ketones such as acetone. The amount of the poor solvent used is, for example, 1 to 10 parts by weight, preferably 2 to 7 parts by weight, with respect to 1 part by weight of the aqueous solution.

The dissolution fractionation can be carried out, for example, by: adding a mixed solvent of water and an organic solvent (e.g., a ketone such as acetone, or an alcohol such as ethanol) to the low substituted cellulose acetate (solid matter) obtained by the precipitation or the low substituted cellulose acetate (solid matter) obtained by the precipitation fractionation; stirring the mixture at an appropriate temperature (e.g., 20 to 80° C., preferably 25 to 60° C.); then separating between a concentrate phase and a dilute phase by centrifugation; adding a precipitation solvent (e.g., a ketone such as acetone, or an alcohol such as methanol) to the dilute phase; and recovering the precipitates (solid matter). The concentration of the organic solvent in the mixed solvent of water and the organic solvent is, for example, 5 to 50% by weight, preferably 10 to 40% by weight.

[(C) Washing and Neutralization Step]

It is preferred that the precipitates (solid matter) obtained in the precipitation step (B) should be washed with an organic solvent (poor solvent), for example, an alcohol such as methanol, or a ketone such as acetone. It is also preferred that the precipitates should be washed and neutralized with an organic solvent (e.g., an alcohol such as methanol, or a ketone such as acetone) containing a basic substance.

For example, an alkali metal compound (e.g., alkali metal hydroxides such as sodium hydroxide and potassium hydroxide; alkali metal carbonates such as sodium carbonate and potassium carbonate; alkali metal bicarbonates such as sodium bicarbonate; alkali metal carboxylates such as sodium acetate and potassium acetate; and sodium alkoxides such as sodium methoxide and sodium ethoxide) or an alkaline earth metal compound (e.g., alkaline earth metal hydroxides such as magnesium hydroxide and calcium hydroxide; alkaline earth metal carbonates such as magnesium carbonate and calcium carbonate; alkaline earth metal carboxylates such as magnesium acetate and calcium acetate; and alkaline earth metal alkoxides such as magnesium ethoxide) can be used as the basic substance. Among these, an alkali metal compound such as potassium acetate is particularly preferred.

Impurities such as the catalyst (sulfuric acid, etc.) used in the hydrolysis step can be efficiently removed by this washing and neutralization.

[Carbon Material (B)]

In the present invention, at least one carbon material (B) selected from the group consisting of single-walled carbon nanotube, multi-walled carbon nanotube, single-layer graphene, multi-layer graphene, fullerene, and carbon black is used as a conductive filler in order to impart conductivity to the resin composition. Single-walled and multi-walled carbon nanotubes, single-layer and multi-layer graphenes, fullerene, and carbon black are common in that they are composed of carbon atoms, and can impart high conductivity to the resin composition by mixing with cellulose-based resins. Carbon nanotubes, graphenes, and fullerene are carbon allotropes.

The carbon nanotubes (CNTs) are classified into single-walled carbon nanotube having a single graphite film (graphene sheet) forming the tube and multi-walled carbon nanotube having multiple graphite films (graphene sheets) forming the tube. The number of films in the multi-walled carbon nanotube is, for example, 2 to 50, preferably 3 to 30. Each carbon nanotube is not limited by its raw material and production method.

The diameter (outer diameter) of the carbon nanotube is usually 0.5 to 180 nm, preferably 0.7 to 100 nm, more preferably 1 to 50 nm, on average. The length of the carbon nanotube is usually 0.2 μm to 2000 μm, preferably 0.3 μm to 1000 μm, more preferably 0.5 μm to 100 μm, particularly preferably 1 μm to 50 μm, on average. The aspect ratio of the carbon nanotube is preferably not less than 5, more preferably not less than 50.

The graphenes are one-atom thick sheets of $sp^2$-bonded carbon atoms and are classified into single-layer graphene and multi-layer graphene. The number of layers in the multi-layer graphene is on the order of, for example, 2 to 200, preferably 3 to 50. The maximum dimension in the plane direction of each graphene sheet is on the order of, for example, 1 to 100 µm.

Fullerene is a cluster constituted by not less than several tens of carbon atoms. Typical fullerene is $C_{60}$ fullerene.

Carbon black is fine particles of carbon having a diameter on the order of 3 to 500 nm. Carbon black is not limited by its raw material and production method.

In the present invention, the content of the carbon material (B) in the conductive cellulose-based resin composition can be selected within a wide range and is, for example, 0.1 to 80% by weight, preferably 1 to 70% by weight, more preferably 3 to 60% by weight. In the present invention, high conductivity is exhibited even if the content of the carbon material (B) is small. Also, moldability is excellent even if the carbon material (B) is contained in a large amount.

[Production of Conductive Cellulose-Based Resin Composition]

An arbitrary method is adopted for the production of the conductive cellulose-based resin composition of the present invention. For example, a dispersion containing the cellulose acetate ester (A) having a total degree of acetyl substitution of 0.5 to 1.1, the carbon material (B), water, and optionally, a dispersant, a surfactant, and other additives is prepared and then shaped (e.g., casted in the form of a film or a sheet), and the shaped molded material containing water can be solidified by drying to obtain the conductive cellulose-based resin composition of the present invention and the conductive molding of the present invention. The conductive cellulose-based resin composition of the present invention means a resin composition after removal of the solvent by drying.

A mixing machine is usually used for preparing the dispersion. Examples of the mixing machine include containers with stirrers, Henschel mixers, bead mills, Plasto-Mill, Banbury mixers, and extruders.

The amount of water used for the preparation of the dispersion can be appropriately selected according to the type and amount of the cellulose acetate ester (A), the type and amount of the carbon material (B), etc., and is usually 10 to 3000 parts by weight, preferably 20 to 2000 parts by weight, with respect to 100 parts by weight of the cellulose acetate ester (A) and usually 200 to 300000 parts by weight, preferably 300 to 20000 parts by weight, with respect to 100 parts by weight of the carbon material (B).

Other additives can each be any additive that does not impair the conductivity of the resin composition, and examples thereof include resins other than the cellulose acetate ester (A), fillers [except for the carbon material (B)], light stabilizers, colorants, fluidity modifiers, antistatic agents, antimicrobial agents, ultraviolet absorbers, antioxidants, lubricants, plasticizers, mold release agents, and flame retardants. The amounts of these additives used are each preferably not more than 30% by weight, more preferably not more than 15% by weight, further preferably not more than 5% by weight, in terms of the contents in the conductive cellulose-based resin composition. The total amount of these additives added is preferably not more than 30% by weight, more preferably not more than 20% by weight, further preferably not more than 10% by weight, in terms of the contents in the conductive cellulose-based resin composition.

Examples of preferred methods for producing the conductive cellulose-based resin composition of the present invention and the conductive molding of the present invention include methods comprising the following steps (1) to (4):

(1) the step of dissolving the cellulose acetate ester (A) having a total degree of acetyl substitution of 0.5 to 1.1 in water;

(2) the step of adding an aqueous dispersion of the carbon material (B) to the aqueous solution of the cellulose acetate ester (A) prepared in the step (1), followed by mixing and stirring;

(3) the step of shaping the dispersion obtained in the step (2); and (4) the step of solidifying the shaped molded material containing water by drying.

According to the method mentioned above, a conductive cellulose-based resin composition very superior in conductivity can be obtained, probably because aggregates in which a plurality of molecules of the carbon material (B) are gathered are almost uniformly dispersed in a matrix resin made of the cellulose acetate ester (A).

Although the reason why the conductive cellulose-based resin composition of the present invention exhibits higher conductivity compared with resin compositions containing other general-purpose resins is not clear, it is considered that the cellulose acetate ester (A) and the carbon material (B) have moderate affinity and thus form a dispersed state by which conductivity is easily exhibited.

The volume resistivity of the conductive cellulose-based resin composition thus obtained is usually 10-3 to 20 Ω·cm, preferably 10-3 to 1 Ω·cm.

According to the present invention, environmental burdens can be reduced because a molding can be produced in an aqueous system. Furthermore, the conductive cellulose-based resin composition of the present invention and the conductive molding of the present invention exhibit very high conductivity even without the use of a special resin or a third component such as an iron or cobalt component. The conductive molding (film, sheet, etc.) of the present invention can be used, for example, as a conductive material for use in wiring for electrical or electronic instruments, etc., or as a conductive material such as a shield material for electromagnetic wave cutoff or absorption or a material for prevention of ESD (electrostatic discharge sensitive).

EXAMPLES

Hereinafter, the present invention will be described in more detail with reference to Examples. However, the present invention is not intended to be limited by these Examples.

Synthesis Example 1

With respect to 1 part by weight of cellulose acetate (manufactured by Daicel Corp., trade name "L-50", total degree of acetyl substitution: 2.43, 6% viscosity: 110 mPa·s), 5.1 parts by weight of acetic acid and 2.0 parts by weight of water were added, and the mixture was stirred at 40° C. for 5 hours to obtain a solution homogeneous in the outer appearance. To this solution, 0.13 parts by weight of sulfuric acid were added, and the obtained solution was kept at 70° C. for hydrolysis (partial deacetylation reaction; ripening). For this ripening process, water was added to the system two times during the course thereof. Specifically, 0.67 parts by weight of water were added 1 hour after the start of the reaction, and 1.67 parts by weight of water were added 2 hours thereafter, followed by reaction for another 3 hours. The total time of hydrolysis is 6 hours. The operation from the start of the reaction to the first addition of water is referred to as the first ripening; the operation from the first addition of water to the second addition of water is referred to as the second ripening; and the operation from the second addition of water to the termination of the reaction (completion of ripening) is referred to as the third ripening.

After the hydrolysis, the temperature of the system was lowered to room temperature (approximately 25° C.) by cooling, and precipitation was caused by adding 15 parts by weight of a mixed solvent of acetone/methanol 1:1 (weight ratio) (precipitating agent) to the reaction mixture.

The precipitates were recovered as wet cake having a solid content of 15% by weight, and 8 parts by weight of methanol were added thereto, followed by washing by deliquoring until a solid content of 15% by weight. This operation was repeated three times. The washed precipitates were further washed and neutralized two times with 8 parts by weight of methanol containing 0.04% by weight of potassium acetate, and dried to obtain low substituted cellulose acetate.

Synthesis Examples 2 to 12

Each low substituted cellulose acetate was obtained in the same way as in Synthesis Example 1 except that the reaction temperature, the first ripening time, the second ripening time, the third ripening time, and the precipitating agent were set to conditions shown in Table 1.

The total degree of acetyl substitution (DS), the weight-average degree of polymerization (DPw), the polydispersity (Mw/Mn), and the compositional distribution index (CDI) of the low substituted cellulose acetate obtained in each Synthesis Example were measured by methods given below. The production conditions and the results of measuring the physical properties of the obtained low substituted cellulose acetate are shown in Table 1. In Table 1, "Sample No." means the sample number of the obtained low substituted cellulose acetate.

(Measurement of Degree of Substitution (DS))

The unsubstituted hydroxy groups of each low substituted cellulose acetate sample were propionylated in accordance with the method of Tezuka (Carbohydr. Res. 273, 83 (1995)). The degree of acetyl substitution of the propionylated low substituted cellulose acetate was determined in accordance with the method of Tezuka (idem) from the signals of acetyl carbonyl at 169 to 171 ppm and the signals of propionyl carbonyl at 172 to 174 ppm in $^{13}$C-NMR.

(Measurement of Weight-Average Degree of Polymerization (DPw) and Polydispersity (Mw/Mn))

The weight-average degree of polymerization and the polydispersity of each low substituted cellulose acetate were determined by GPC-light scattering measurement under the following conditions after conversion to propionylated low substituted cellulose acetate:

Apparatus: Shodex GPC "SYSTEM-21H" manufactured by Showa Denko K.K.

Solvent: acetone

Column: Two GMHxl columns (Tosoh Corp.) with guard columns (Tosoh Corp.)

Flow rate: 0.8 ml/min

Temperature: 29° C.

Sample concentration: 0.25% (wt/vol)

Injection volume: 100 µl

Detection: MALLS (multi-angle laser light scattering) (manufactured by Wyatt Technology Corp., "DAWN-EOS")

Standard for MALLS correction: PMMA (molecular weight: 27600)

(Measurement of Compositional Distribution Index (CDI))

CDI of each low substituted cellulose acetate was determined by HPLC analysis under the following conditions after conversion to propionylated low substituted cellulose acetate:

Apparatus: Agilent 1100 Series

Column: Waters Nova-Pak phenyl 60 Å 4 µm (150 mm×3.9 mmΦ)+guard column

Column temperature: 30° C.

Detection: Varian 380-LC

Injection volume: 5.0 µL (sample concentration: 0.1% (wt/vol))

Eluent: solution A: MeOH/H$_2$O=8/1 (v/v), solution B: CHCl$_3$/MeOH=8/1 (v/v)

Gradient: A/B=80/20→0/100 (28 min); Flow rate: 0.7 mL/min

First, preparations having known DS in an acetyl DS (total degree of acetyl substitution) range of 0 to 3 were subjected to HPLC analysis to prepare a calibration curve of elution time vs. DS. On the basis of the calibration curve, an elution curve (time vs. detection intensity curve) of an unknown sample was converted to a DS vs. detection intensity curve (compositional distribution curve). An uncorrected half height width X in this compositional distribution curve was determined, and a corrected half height width Z of compositional distribution was determined according to the following expression:

$$Z=(X^2-Y^2)^{1/2}$$

Y represents an apparatus constant defined according to the following expression:

$$Y=ax+b$$

a: the X value of the preparation having acetyl DS=3 b: the X value of the preparation having acetyl DS=0 x: acetyl DS of the unknown sample

The compositional distribution index (CDI) was determined from the corrected half height width Z according to the following expression:

$$CDI=Z/Z_0$$

In this context, $Z_0$ represents compositional distribution formed when acetylation and partial deacetylation in the preparation of all partially substituted cellulose acetates occur with equal probability among all hydroxy groups (or acetyl groups) in all molecules, and is defined according to the following expression:

$$Z_0=2.35482\sqrt{3 \cdot DPw \cdot p \cdot q}/DPw \qquad \text{[Expression 5]}$$

DPw: the weight-average degree of polymerization p: (Acetyl DS of the unknown sample)/3 q: 1−P

TABLE 1

Production conditions and physical properties of low substituted cellulose acetate

| Synthesis No. | Sample No. | Reaction temperature (° C.) | Reaction time First ripening (hr) | Reaction time Second ripening (hr) | Reaction time Third ripening (hr) | Total (hr) | Posttreatment Precipitating agent | DS (—) | DPw (—) | Mw/Mn (—) | CDI (—) |
|---|---|---|---|---|---|---|---|---|---|---|---|
| Synthesis Example 1 | WSCA-70-1.2 | 70 | 1 | 2 | 3 | 6 | Acetone/methanol (1/2, w/w) | 1.21 | 358 | 2.1 | 1.5 |
| Synthesis Example 2 | WSCA-70-1.1 | 70 | 1 | 2 | 4 | 7 | Acetone/methanol (1/2, w/w) | 1.10 | 272 | 2.0 | 1.4 |
| Synthesis Example 3 | WSCA-70-1.0 | 70 | 1 | 2 | 5 | 8 | Acetone/methanol (1/2, w/w) | 1.00 | 214 | 1.9 | 1.5 |
| Synthesis Example 4 | WSCA-70-0.9 | 70 | 1 | 2 | 6 | 9 | Acetone/methanol (1/2, w/w) | 0.87 | 180 | 1.9 | 1.4 |
| Synthesis Example 5 | WSCA-70-0.8 | 70 | 1 | 2 | 7 | 10 | Acetone/methanol (1/1, w/w) | 0.81 | 155 | 1.9 | 1.4 |
| Synthesis Example 6 | WSCA-70-0.7 | 70 | 1 | 2 | 8 | 11 | Acetone/methanol (1/1, w/w) | 0.76 | 134 | 1.9 | 1.5 |
| Synthesis Example 7 | WSCA-70-0.6 | 70 | 1 | 2 | 9 | 12 | Acetone/methanol (1/1, w/w) | 0.63 | 120 | 1.9 | 1.6 |
| Synthesis Example 8 | WSCA-70-0.5 | 70 | 1 | 2 | 11 | 14 | Acetone/2-propanol (1/2, w/w) | 0.51 | 97 | 1.9 | 1.6 |
| Synthesis Example 9 | WSCA-70-0.4 | 70 | 1 | 2 | 14 | 17 | Acetone/2-propanol (1/2, w/w) | 0.39 | 75 | 1.8 | 1.7 |
| Synthesis Example 10 | WSCA-40-0.9 | 40 | 8 | 16 | 36 | 60 | Methanol | 0.87 | 170 | 2.0 | 2.4 |
| Synthesis Example 11 | WSCA-40-0.8 | 40 | 8 | 16 | 42 | 66 | Methanol | 0.79 | 144 | 2.0 | 2.1 |
| Synthesis Example 12 | WSCA-40-0.7 | 40 | 8 | 16 | 50 | 74 | Methanol | 0.70 | 117 | 2.0 | 2.6 |

Examples 1 to 10 and Comparative Examples 1 to 2

The low substituted cellulose acetate obtained in each of Synthesis Examples 1 to 12, a dispersion containing 4% by weight of a carbon nanotube (multi-walled, outer diameter: approximately 13 nm; manufactured by Wako Pure Chemical Industries, Ltd.), and water were mixed at a ratio shown in Table 2 to prepare an aqueous dispersion containing the low substituted cellulose acetate and the carbon nanotube. The sample number of the low substituted cellulose acetate used was described in the column "Polymer" of Table 2.

Specifically, a predetermined amount of the low substituted cellulose acetate and a predetermined amount of water were placed in a glass container with stirring blades and mixed by stirring at 25±5° C. for 16 hours to prepare an aqueous solution of the low substituted cellulose acetate. To this aqueous solution of the low substituted cellulose acetate, the dispersion containing 4% by weight of the carbon nanotube was added in a predetermined amount, and the mixture was further stirred for 4 hours to obtain a aqueous dispersion of the low substituted cellulose acetate containing the carbon nanotube (CNT) at a predetermined content (1% by weight, 10% by weight, 20% by weight, 30% by weight, 40% by weight, and 50% by weight). The obtained aqueous dispersion was left standing for 7 days.

The aqueous dispersion was casted onto a glass plate using a bar coater such that the amount of the aqueous dispersion applied was adjusted to give a thickness of 45 μm in terms of a solid content after drying. The coating was dried at 70° C. for 90 minutes to prepare a film. The formed film was separated from the glass plate and further dried at 70° C. for 30 minutes.

The volume specific resistance (volume resistivity) (Ω·cm) of the obtained film was measured according to JIS K7194. Trade name "Loresta" (model MCP-T610) (manufactured by Mitsubishi Chemical Analytech Co., Ltd.) was used as a measurement apparatus. The results are shown in Table 3. In Table 3, "-" represents that the film failed to be a self-supported film by separation from the glass plate because cracks occurred in the film or the film was fragile.

Comparative Examples 3 to 5

Each polyvinyl alcohol, a dispersion containing 4% by weight of a carbon nanotube (multi-walled, outer diameter: approximately 13 nm; manufactured by Wako Pure Chemical Industries, Ltd.), and water were mixed at a ratio shown in Table 2 to prepare an aqueous dispersion containing the polyvinyl alcohol and the carbon nanotube. The product number of the polyvinyl alcohol ("Kuraray POVAL"; manufactured by Kuraray Co., Ltd.) used was described in the column "Polymer" of Table 2. The physical properties of each polyvinyl alcohol are shown below.

"PVA 117": degree of saponification: 98.7%, viscosity of the aqueous solution (4% by weight, 20° C.): 28.2 mPa·s "PVA HC": degree of saponification: 99.9%, viscosity of the aqueous solution (4% by weight, 20° C.): 24.8 mPa·s "PVA 217": degree of saponification: 88.1%, viscosity of the aqueous solution (4% by weight, 20° C.): 22.6 mPa·s Specifically, a predetermined amount of the polyvinyl alcohol and a predetermined amount of water were placed in a glass container with stirring blades and mixed by stirring at 70±5° C. for 7 hours to prepare an aqueous solution of the polyvinyl alcohol. This aqueous solution of the polyvinyl alcohol was cooled to 25±5° C., then a dispersion containing 4% by weight of a carbon nanotube (multi-walled, outer diameter: approximately 13 nm; manufactured by Wako Pure Chemical Industries, Ltd.) was added thereto in a predetermined amount, and the mixture was further stirred for 4 hours to obtain a aqueous dispersion of the polyvinyl alcohol containing the carbon nanotube at a predetermined content (% by weight).

The aqueous dispersion was casted onto a glass plate using a bar coater such that the amount of the aqueous dispersion applied was adjusted to give a thickness of 45 μm in terms of a solid content after drying. The coating was dried at 70° C. for 90 minutes to prepare a film. The formed film was separated from the glass plate and further dried at 70° C. for 30 minutes.

The volume specific resistance (volume resistivity) (Ω·cm) of the obtained film was measured according to JIS K7194. Trade name "Loresta" (model MCP-T610) (manufactured by Mitsubishi Chemical Analytech Co., Ltd.) was used as a measurement apparatus. The results are shown in Table 3.

TABLE 2

Preparation formula of aqueous dispersion containing polymer and CNT

| Example or Comparative Example No. | Polymer | CNT content (%) 1 Polymer (part by weight) | 1 Water (part by weight) | 10 Polymer (part by weight) | 10 Water (part by weight) | 20 Polymer (part by weight) | 20 Water (part by weight) | 30 Polymer (part by weight) | 30 Water (part by weight) | 40 Polymer (part by weight) | 40 Water (part by weight) | 50 Polymer (part by weight) | 50 Water (part by weight) |
|---|---|---|---|---|---|---|---|---|---|---|---|---|---|
| Comparative Example 1 | WSCA-70-1.2 | 400.0 | 3,000.0 | 40.0 | 260.0 | 16.0 | 66.7 | 13.3 | 66.7 | 10.0 | 65.0 | 4.0 | 20.0 |
| Example 1 | WSCA-70-1.1 | 400.0 | 3,000.0 | 40.0 | 260.0 | 16.0 | 66.7 | 13.3 | 66.7 | 10.0 | 65.0 | 4.0 | 20.0 |
| Example 2 | WSCA-70-1.0 | 400.0 | 3,000.0 | 40.0 | 260.0 | 16.0 | 66.7 | 13.3 | 66.7 | 10.0 | 65.0 | 4.0 | 20.0 |
| Example 3 | WSCA-70-0.9 | 400.0 | 3,000.0 | 40.0 | 260.0 | 16.0 | 66.7 | 13.3 | 66.7 | 10.0 | 65.0 | 4.0 | 20.0 |
| Example 4 | WSCA-70-0.8 | 400.0 | 3,000.0 | 40.0 | 260.0 | 16.0 | 66.7 | 13.3 | 66.7 | 10.0 | 65.0 | 4.0 | 20.0 |
| Example 5 | WSCA-70-0.7 | 400.0 | 3,000.0 | 40.0 | 260.0 | 16.0 | 66.7 | 13.3 | 66.7 | 10.0 | 65.0 | 4.0 | 20.0 |
| Example 6 | WSCA-70-0.6 | 400.0 | 3,000.0 | 40.0 | 260.0 | 16.0 | 66.7 | 13.3 | 66.7 | 10.0 | 65.0 | 4.0 | 20.0 |
| Example 7 | WSCA-70-0.5 | 400.0 | 3,000.0 | 40.0 | 260.0 | 16.0 | 66.7 | 13.3 | 66.7 | 10.0 | 65.0 | 4.0 | 20.0 |
| Comparative Example 2 | WSCA-70-0.4 | 400.0 | 3,000.0 | 40.0 | 260.0 | 16.0 | 66.7 | 13.3 | 66.7 | 10.0 | 65.0 | 4.0 | 20.0 |
| Example 8 | WSCA-40-0.9 | 400.0 | 3,000.0 | 40.0 | 260.0 | 16.0 | 66.7 | 13.3 | 66.7 | 10.0 | 65.0 | 4.0 | 20.0 |
| Example 9 | WSCA-40-0.8 | 400.0 | 3,000.0 | 40.0 | 260.0 | 16.0 | 66.7 | 13.3 | 66.7 | 10.0 | 65.0 | 4.0 | 20.0 |
| Example 10 | WSCA-40-0.7 | 400.0 | 3,000.0 | 40.0 | 260.0 | 16.0 | 66.7 | 13.3 | 66.7 | 10.0 | 65.0 | 4.0 | 20.0 |
| Comparative Example 3 | PVA 117 | 400.0 | 3,000.0 | 40.0 | 260.0 | 16.0 | 66.7 | 13.3 | 66.7 | 10.0 | 65.0 | 4.0 | 20.0 |
| Comparative Example 4 | PVA HC | 400.0 | 3,000.0 | 40.0 | 260.0 | 16.0 | 66.7 | 13.3 | 66.7 | 10.0 | 65.0 | 4.0 | 20.0 |
| Comparative Example 5 | PVA 217 | 400.0 | 3,000.0 | 40.0 | 260.0 | 16.0 | 66.7 | 13.3 | 66.7 | 10.0 | 65.0 | 4.0 | 20.0 |

TABLE 3

Volume resistivity of polymer film (Ω · cm)

| Example or Comparative Example No. | Polymer | CNT content (%) 1 | 10 | 20 | 30 | 40 | 50 |
|---|---|---|---|---|---|---|---|
| Comparative Example 1 | WSCA-70-1.2 | 12400 | — | — | — | — | — |
| Example 1 | WSCA-70-1.1 | 202 | 0.8708198 | 0.22 | 0.15 | — | — |
| Example 2 | WSCA-70-1.0 | 129 | 0.8708198 | 0.21 | 0.11 | 0.06 | — |
| Example 3 | WSCA-70-0.9 | 98 | 0.7 | 0.19 | 0.09 | 0.049 | 0.028 |
| Example 4 | WSCA-70-0.8 | 104 | 0.9 | 0.21 | 0.08 | 0.041 | 0.03 |
| Example 5 | WSCA-70-0.7 | 99 | 1.1 | 0.24 | 0.09 | 0.07 | 0.031 |
| Example 6 | WSCA-70-0.6 | 118 | 1 | 0.2 | 0.12 | 0.1 | — |
| Example 7 | WSCA-70-0.5 | 198 | 0.9 | 0.24 | 0.17 | — | — |
| Comparative Example 2 | WSCA-70-0.4 | 32200 | — | — | — | — | — |
| Example 8 | WSCA-40-0.9 | 178 | 0.6 | 0.19 | 0.11 | — | — |
| Example 9 | WSCA-40-0.8 | 136 | 1.1 | 0.23 | 0.13 | — | — |
| Example 10 | WSCA-40-0.7 | 89 | 0.9 | 0.27 | 0.1 | — | — |
| Comparative Example 3 | PVA 117 | 102000000 | 12000 | 311 | 102 | — | — |
| Comparative Example 4 | PVA HC | 99000000 | 9070 | 689 | 50 | 34 | 11.9 |
| Comparative Example 5 | PVA 217 | 11300000 | 5020 | 447 | — | — | — |

As shown in Table 3, the film of each Example can exert very high conductivity, because the film is excellent in conductivity even when having a small content of the carbon material and can also maintain its form of a film even when having a large content of the carbon material.

INDUSTRIAL APPLICABILITY

The conductive cellulose-based resin composition of the present invention and the molding thereof exhibit high conductivity even without the use of a special resin or a third component. In addition, the conductive cellulose-based resin composition can be easily molded in an aqueous system. Therefore, the resulting molding can be used, for example, as a conductive material for use in wiring for electrical or electronic instruments, etc., or as a conductive material such as a shield material for electromagnetic wave cutoff or absorption or a material for prevention of ESD (electrostatic discharge sensitive).

The invention claimed is:

1. A conductive cellulose-based resin composition comprising
   (A) a cellulose acetate having a total degree of acetyl substitution of 0.5 to 1.1 and
   (B) at least one carbon material selected from the group consisting of single-walled carbon nanotube, multi-walled carbon nanotube, single-layer graphene, multi-layer graphene, fullerene, and carbon black wherein the content of the carbon material (B) is 10 to 80% by weight of the whole conductive cellulose-based resin composition, and,
   wherein the volume resistivity of the conductive cellulose-based resin composition is $10^{-3}$ to 20 $\Omega \cdot$cm.

2. The conductive cellulose-based resin composition according to claim 1, wherein the volume resistivity is $10^{-3}$ to 1 $\Omega \cdot$cm.

3. The conductive cellulose-based resin composition according to claim 2, wherein the compositional distribution index (CDI) of cellulose acetate defined below is 1.0 to 2.0:

CDI=(Actual measurement value of the half height width of compositional distribution)/(Theoretical value of the half height width of compositional distribution), Actual measurement value of the half height width of compositional distribution: the half height width of compositional distribution determined by the HPLC analysis of cellulose acetate propionate obtained by propionylating all residual hydroxy groups in cellulose acetate (sample), Theoretical value of the half height width of compositional distribution=2.35482 $\sqrt{3*DPw(DS/3)*(1-DS/3)/DPw}$[Expression 1]

DS: the total degree of acetyl substitution, and

DPw: the weight-average degree of polymerization value determined by the GPC-light scattering method using cellulose acetate propionate obtained by propionylating all residual hydroxy groups in cellulose acetate (sample).

4. The conductive cellulose-based resin composition according to claim 1, wherein the compositional distribution index (CDI) of cellulose acetate defined below is 1.0 to 2.0:

CDI=(Actual measurement value of the half height width of compositional distribution)/(Theoretical value of the half height width of compositional distribution), Actual measurement value of the half height width of compositional distribution: the half height width of compositional distribution determined by the HPLC analysis of cellulose acetate propionate obtained by propionylating all residual hydroxy groups in cellulose acetate (sample), Theoretical value of the half height width of compositional distribution=2.35482 $\sqrt{3*DPw(DS/3)*(1-DS/3)/DPw}$[Expression 1]

DS: the total degree of acetyl substitution, and

DPw: the weight-average degree of polymerization value determined by the GPC-light scattering method using cellulose acetate propionate obtained by propionylating all residual hydroxy groups in cellulose acetate (sample).

5. A conductive molding comprising a conductive cellulose-based resin composition according to claim 1.

6. A method for producing a conductive molding according to claim 5, comprising the step of shaping an aqueous dispersion containing (A) a cellulose acetate having a total degree of acetyl substitution of 0.5 to 1.1 and (B) at least one carbon material selected from the group consisting of single-walled carbon nanotube, multi-walled carbon nanotube, single-layer graphene, multi-layer graphene, fullerene, and carbon black, and drying the shaped molded material containing water.

7. A conductive molding comprising a conductive cellulose-based resin composition according to claim 2.

8. A conductive molding comprising a conductive cellulose-based resin composition according to claim 4.

* * * * *